July 27, 1954
C. E. GREGORY
2,684,741
COUPLING DEVICE
Filed Oct. 8, 1948
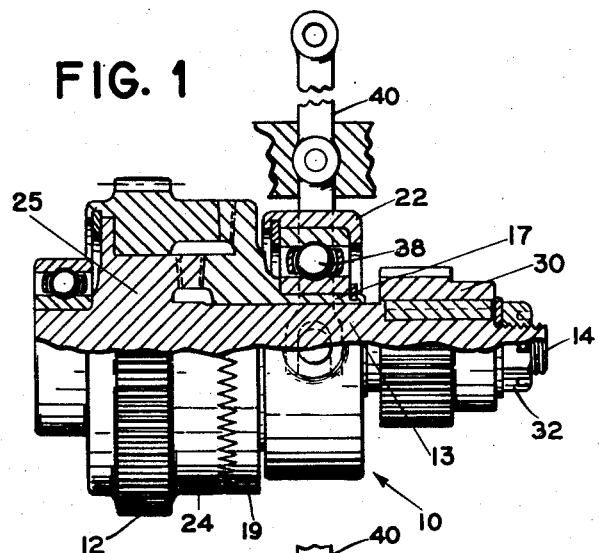
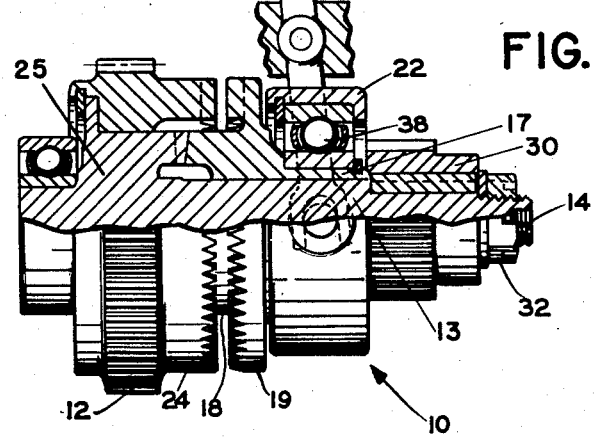
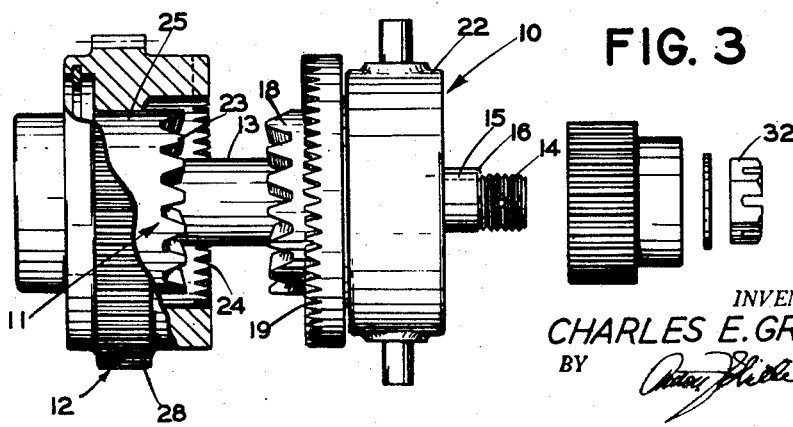
INVENTOR.
CHARLES E. GREGORY
BY
—ATTORNEY, Patented July 27, 1954

2,684,741

UNITED STATES PATENT OFFICE 2,684,741

COUPLING DEVICE

Charles E. Gregory, East Paterson, N. J., assignor to Bendix Aviation Corporation, Teterboro, N. J., a corporation of Delaware Application October 8, 1948, Serial No. 53,396

5 Claims. (Cl. 192—67)

This invention relates to disconnecting means, and more particularly to means for disengaging coupled apparatus under heavy torque loads.

It is desirable in many instances, such as in remote control systems, for example, to provide a releasable coupling between a driven member and its driving member when the latter is under a heavy torque load. Disconnect devices directed toward this end have been proposed in the past, but most of them possess certain inherent structural and functional disadvantages which have been substantially eliminated in the novel disconnect device of the present invention.

In the prior devices, the disengagement of coupled members is usually attempted through the use of sliding key-ways or by means of splined coupling devices. However, in attempting to so disengage the coupled members while under heavy torque load, the frictional characteristic inherent in the use of sliding key-ways and splined devices operates detrimentally so that beyond a certain axial thrust the coupled members substantially conjoin or "freeze" together so as to prevent complete disengagement.

By means of the present invention a novel disconnecting device is provided, particularly for heavy torque loads, which uses a minimum of disconnecting force and which efficiently and quickly disengages a driven member from its associated driving member under heavy torque load. The novel disengaging device of the present invention overcomes the frictional characteristic which causes the freezing of the coupling members in the usual disengaging device. This is done by utilizing two separate and distinct pairs of concentric interlocking toothed members so that the forces or components which tend to conjoin the coupling elements, operate to substantially obviate or overcome the frictional component which would lock the driving member to its driven member.

An object of my present invention, therefore, is to provide a novel releasable coupling between engaged members, particularly under heavy torque loads.

Another object of my invention is to provide a novel disconnect device adapted for use in remote control systems, whereby coupled elements contained in such systems may be efficiently and rapidly disengaged.

A further object of the present invention is to provide a novel disengaging device which utilizes two sets of toothed members for overcoming the frictional characteristics residing in the coupling while under heavy torque load.

Still another object of my invention is to provide a disconnecting device of the character indicated having a multiplicity of concentric toothed members which are utilized to overcome the frictional components developed during axial disengagement of coupled members.

Other objects of this invention will in part be obvious and in part hereinafter pointed out.

In the accompanying drawings forming a part of this specification in which one of the various illustrative embodiments of this invention is shown, and wherein similar reference characters designate corresponding parts throughout the several views, Figure 1 is a side-elevational view of a disconnect device embodying my invention, with portions thereof shown in cross-section, showing the coupling device in an engaged position;

Figure 2 is a side-elevational view similar to that of Figure 1, but showing the coupling device in a disengaged position; while Figure 3 is an exploded side-elevational view of the coupling device of the present invention, showing portions thereof in cross-section, and illustrating the novel plural toothed member arrangement and construction thereof.

Generally speaking, the present novel coupling device provides means for engaging and/or disengaging a driving member from its driven member while the driving member is under heavy torque load. By utilizing a system of plural concentric toothed members, the torque existing between the disconnecting members creates an axial thrust tending to separate the members and to overcome the "freezing" of one member to the other as often happens in the prior coupling devices.

Referring to the drawing, and more particularly to Figure 3, the novel coupling device of the present invention comprises, in the form shown, a disconnecting member 10, a driving member 11 and a driven member 12. Driving member 11 includes a shaft 13 having a threaded end 14 which has a slotted shoulder forming key-ways 15 into which keys 16 may be inserted so as to provide the proper stop construction for disconnecting member 10, as will hereinafter be described.

Disconnecting member 10 includes a tubular shaft 17 with two concentric toothed surfaces having teeth 18 and 19 cut integrally with said shaft. Circumscribing tubular shaft 17 and rotatably mounted thereupon, as by means of ball bearings 38, is a trunnion member 22 which may be connected to external actuating means, such as a lever 40, for providing the necessary axial thrust to disconnect the coupling device.

The entire disconnecting member 10 is adapted to rotate about and slide axially along shaft 13. The shaft is provided with a shoulder 25 having teeth 23 cut therein adapted to engage teeth 18 of disconnecting member 10. Driven member 12 is rotatably supported on shaft 13 and adapted to rotate about shoulder 25. Member 12 has teeth 24 cut therein for meshing with teeth 19 of disconnecting member 17 and has formed on the periphery thereof a spur gear 26. In order to limit the axial movement of disconnecting member 10 there is provided a stop member 30, here shown as a spur gear, keyed to shaft 13 as by key 16 and held in position by adjustable stop nut 32. As is clearly apparent from the drawing, mating teeth 18 and 23 are longer than mating teeth 19 and 24 so that when member 10 is shifted from the position shown in Fig. 1, in which position it forms a driving connection between driving member 11 and driven member 12 through meshing teeth 18, 23 and 19, 24, against stop member 30 as shown in Fig. 2 by moving lever 40 in a counter-clockwise direction, teeth 19 and 24 will be completely disconnected but teeth 18 and 23 will remain in engagement so as to insure proper remeshing between driving member 11 and shaft 17.

In the coupled position shown in Fig. 1, disconnecting member 10 is locked in position, preferably by an overcenter linkage (not shown), connected to lever 40 in order to prevent accidental uncoupling of the device. As long as the torque load on the coupling device is low, a slight force on lever 40 is sufficient to move disconnect member 10 to the right against stop member 30, but as the load increases the frictional resistance between the engaging teeth of the coupling members also increases. The value of the frictional resistance under any particular load will depend on the angle of friction between the engaging surfaces and of the coefficient of friction therebetween. A common disadvantage of coupling devices of the past has been that the frictional resistance between the coupled members attained such a value as to make it necessary to apply a considerable force on the disconnect member. Particularly in automatic disconnect systems is it desirable that the force necessary to effect a positive uncoupling under all loads be very low. In accordance with the present invention in combination with the members arranged and constructed as shown, the angle which the plane of contact between engaging teeth 18 and 23 makes with the line of force thereon is made sufficiently large to produce a force tending to separate the members substantially equal to the above-mentioned frictional resistance tending to prevent such separation. Thus under heavy torque load the force necessary on lever 40 to separate the engaging surfaces may be made as small as desired. It will be apparent that by making the angle of the pressure surfaces 18 and 23 sufficiently large to completely overcome the frictional resistance, uncoupling may be effected merely by releasing a restraining force applied to lever 40.

There is thus provided a novel coupling which substantially overcomes the frictional disadvantages inherent in other types of clutches, disconnecting or coupling devices where the disconnecting member is connected or keyed to either the driver or driven member by means of key-ways or sliding splines and where all of the torque load must consequently be carried on these sliding devices so as to increase their frictional characteristics.

Although the teeth of the engaging surfaces described herein may be of conventional involute design, any desired tooth form may be used, as long as they will tend to operate under torque loads, if the holding force is removed.

It will thus be seen that there is provided a novel coupling device in which the several objects of this invention are achieved, and which is well adapted to meet the conditions of practical use.

As various embodiments may be made of the above invention, and as various changes may be made in the embodiment set forth above, it will be understood that all matter herein set forth, or shown in the accompanying drawings, is to be interpreted as illustrative and not in a limiting sense.

Having thus described my invention, I claim as new and desire to secure by Letters Patent:

1. A coupling device comprising a driving and a driven power transmitting member, said driven member rotatably mounted on said driving member and fixed axially relative thereto, a coupling member for establishing and breaking a driving connection between said driving and driven members mounted for relative movement with respect to said driving and driven power transmitting members between two limiting positions, a permanent driving engagement between said driving power transmitting member and said coupling member, coacting clutching surfaces on the driven power transmitting member and said coupling member for establishing a driving connection between said driving and driven power transmitting members when said coupling member is in one limiting position and for interrupting said driving connection when said coupling member is in the other limiting position, and means for shifting said coupling member from one limiting position to the other.

2. A coupling device comprising, in combination, driving and driven power transmitting members, said driven member rotatably mounted on said driving member and fixed axially relative thereto, a coupling member axially movable relative to said members between two limiting positions thereof, means for shifting said coupling member from one limiting position to the other, a pair of clutching surfaces having mutually interengaging faces mounted on said driven power transmitting member and on said coupling member, respectively, said clutching surfaces being engaged when said coupling member is in one limiting position and released when said coupling member is in the other limiting position, and interengaging teeth mounted on said coupling member and said driving power transmitting member for establishing a permanent slidable driving connection between said coupling member and said driving power transmitting member.

3. A coupling device comprising, in combination, coaxial relatively rotatable driving and driven power transmitting members, a coupling member axially movable relative to said members between two limiting positions thereof, means for shifting said coupling member from one limiting position to the other, a pair of clutching surfaces having mutually interengaging faces mounted on said driven transmitting member and on said coupling member, respectively, said clutching surfaces being engaged when said coupling member is in one limiting position and released when said coupling member is in the other limiting position, said driven member being disengaged from said coupling member when the latter is in said other limiting position, and interengaging teeth mounted on said coupling member and said driving power transmitting member for establishing a permanent slidable driving connection between said coupling member and said driving power transmitting member, the contact surfaces between the interengaging teeth being at such an angle with the line of force as to produce a component of force on said coupling member tending to move it away from said driving and driven power transmitting members to counteract the tendency of the coupling member to freeze to said driving and driven power transmitting members under heavy torque loading.

4. A quick disconnect coupling device comprising a rotatable power input member, a first power transmitting member driven by said power input member and having a first clutching means formed thereon, a second power transmitting member rotatably mounted on said power input member and slidable axially thereof, a second clutching means integrally formed on said second power transmitting member for constant engagement with said first clutching means to form a fixed driving connection therebetween, a third power transmitting member mounted concentric and in fixed axial relationship with said first power transmitting member and freely rotatable thereon, a third clutching means formed on said third power transmitting member, a fourth clutching means fixed to said second power transmitting member and adapted for engagement with said third clutching means to drive the latter, actuating means connected to said second power transmitting means for sliding the latter axially along the power input member so as to disengage the second and third power transmitting member and the third and fourth clutching means, and means on said power input member for limiting the axial movement of the second power transmitting means to maintain a fixed driving relationship between the first and second clutching means while providing for disengagement of said third and fourth clutching means.

5. A disconnect coupling device for heavy torque loads, comprising a driving member including a shaft and a toothed surface fixed thereto, a driven member mounted in fixed axial relationship to and for rotation on said driving member and having a toothed surface concentric with said first named toothed surface, means for drivably connecting said driving and driven members comprising a sleeve like member mounted for rotation on said shaft and for axial sliding movement relative thereto, said sleeve including a plurality of concentric toothed surfaces interlocking with said toothed surfaces of said driving and driven members, means for sliding said connecting means axially of said shaft to a position wherein one toothed surface of said connecting means is disengaged from the associated toothed surface of said driven member, and means limiting axial movement of said connecting means to maintain a driving connection between the other toothed surface of said connecting means and the associated toothed surface of said driving member.

References Cited in the file of this patent

UNITED STATES PATENTS

| Number | Name | Date |
| --- | --- | --- |
| 1,581,292 | Ross | Apr. 20, 1926 |
| 1,942,217 | Paul | Jan. 2, 1934 |
| 2,160,622 | Olson | May 30, 1939 |
| 2,291,407 | Paul | July 28, 1942 |

FOREIGN PATENTS

| Number | Country | Date |
| --- | --- | --- |
| 162,796 | Great Britain | May 5, 1921 |